United States Patent [19]

Watanabe et al.

[11] Patent Number: 5,697,290
[45] Date of Patent: Dec. 16, 1997

[54] APPARATUS FOR INTERMITTENTLY DISCHARGING A CIRCULAR OR OVAL SHAPED DOUGH SHEET

[75] Inventors: Yukio Watanabe; Michio Morikawa, both of Utsunomiya, Japan

[73] Assignee: Rheon Automatic Machinery Co., Ltd., Japan

[21] Appl. No.: 688,623

[22] Filed: Jul. 30, 1996

[30] Foreign Application Priority Data

Jul. 31, 1995 [JP] Japan ................... 7-214157

[51] Int. Cl.⁶ ................ A21C 3/06; A21C 11/00; A21D 6/00; A23P 1/00
[52] U.S. Cl. ............. 99/450.2; 99/353; 99/450.1; 99/450.7; 425/142; 425/133.1; 425/297; 425/321
[58] Field of Search ............. 99/494, 450.1–450.8, 99/353; 425/321, 319, 335, 297, 364 R, 371, 131.3, 308, 133.1, 112, 467, 513, 382.4, 92, 325, 140–142, 145, 373, 322; 426/501–503, 512, 496

[56] References Cited

U.S. PATENT DOCUMENTS

| | | | |
|---|---|---|---|
| 5,031,520 | 7/1991 | Tsay | 425/133.1 X |
| 5,209,156 | 5/1993 | Lombard | 99/450.1 |
| 5,375,509 | 12/1994 | Taylor et al. | 425/321 X |
| 5,384,142 | 1/1995 | Henson | 426/502 X |
| 5,419,696 | 5/1995 | Henson | 99/450.1 X |
| 5,520,100 | 5/1996 | Wadell | 99/494 |

Primary Examiner—Timothy F. Simone
Attorney, Agent, or Firm—Limbach & Limbach LLP

[57] ABSTRACT

An apparatus is provided to manufacture a circular and edible sheet-like dough topping to be deposited on bread dough. In this apparatus the pressure for discharging the dough decreases from the center of the dough topping toward either of its ends, and at the same time the dough topping is initially discharged from its center followed by a delayed flow toward both ends of the dough topping.

4 Claims, 11 Drawing Sheets

APPARATUS FOR INTERMITTENTLY DISCHARGING A CIRCULAR OR OVAL SHAPED DOUGH SHEET

BACKGROUND OF THE INVENTION

The present invention relates to a food-material discharging apparatus to supply highly elastic and fluid material or plastic dough used for producing foods, to obtain a food material having a circular shape. More specifically, the present invention relates to a dough-topping discharging apparatus for disposing the material on bread, for example, when producing melon bread.

1. Field of the Invention

The field of the present invention belongs to producing confectionery bread. More specifically, the present invention provides a circular topping material to be deposited on round bread.

2. Description of the Prior Art

A prior-art melon-bread producing apparatus is shown in FIG. 13. In this discharging apparatus a dough topping 34 is discharged from above by the action of an extruding pump 32 and a discharge valve 33 to cover bread dough that is separately conveyed by a conveyer belt 30.

Since the dough topping 34 is in the form of a sheet, in this apparatus the dough topping 34 that is supplied to a discharge valve 33 through a supply pipe 35 must be discharged from a long aperture 36 having a predetermind width. Conventionally, a rotor 37 of the type shown in FIG. 14 is used to discharge the dough topping 34 in a sheet-like form. As in FIGS. 15 and 16, the dough topping of a preset shape is gradually shaped into a desired form to discharge it in the sheet-like shape.

The rotor 37 can indeed discharge the dough topping, giving it a sheet-like form. However, in this case the dough topping takes a square or rectangular form. Thus when the dough topping 34 is discharged to cover bread dough 31, the four corner portions of the dough topping appear at the periphery of the bread dough 31, as in FIG. 17. FIG. 18 shows the bottom surface of the baked melon bread 39. FIG. 18 shows that the four extra corner portions of the dough topping 34 before baking are left on the bottom or side surface of the bread dough 31. This gives an ugly appearance to the product.

SUMMARY OF THE INVENTION

The present invention provides a foodstuffs discharge apparatus to intermittently supply foodstuffs by shaping them into a circular or oval sheet form. Such foodstuffs are used in producing cake bread such as melon bread. They are dough toppings consisting of biscuit dough, biscuit dough mixed with chocolate chips or raisins, etc., chocolate, jam, custard cream, etc., or kneaded sea urchins or kneaded cheese that is used for kneaded fish products.

To attain the above purpose the present invention provides an apparatus for intermittently discharging sheet-like foodstuffs, characterized in that the rotor of the apparatus is rotatably mounted, the rotor is provided therein with an inlet to communicate with a material-feeding opening of the housing, a guiding chamber is provided, the cross section of which is larger than that of the inlet, a long aperture is formed in the rotor, the aperture communicates with the guiding chamber, the cross section of the aperture is smaller than that of the guiding chamber, whereby when the foodstuffs are supplied into the rotor through the material-feeding mouth, they pass through the rotor, so that foodstuffs of a circular or oval sheet form are discharged from the discharge outlet of the housing.

The discharge conditions for the central portion and both ends of the food material to be discharged from the long aperture are made to differ. Namely, the discharging amount at the central portion is large and gradually decreases toward either end so as to discharge food material of a circular sheet form.

DESCRIPTION OF THE PREFERRED EMBODIMENTS

Figure 1:
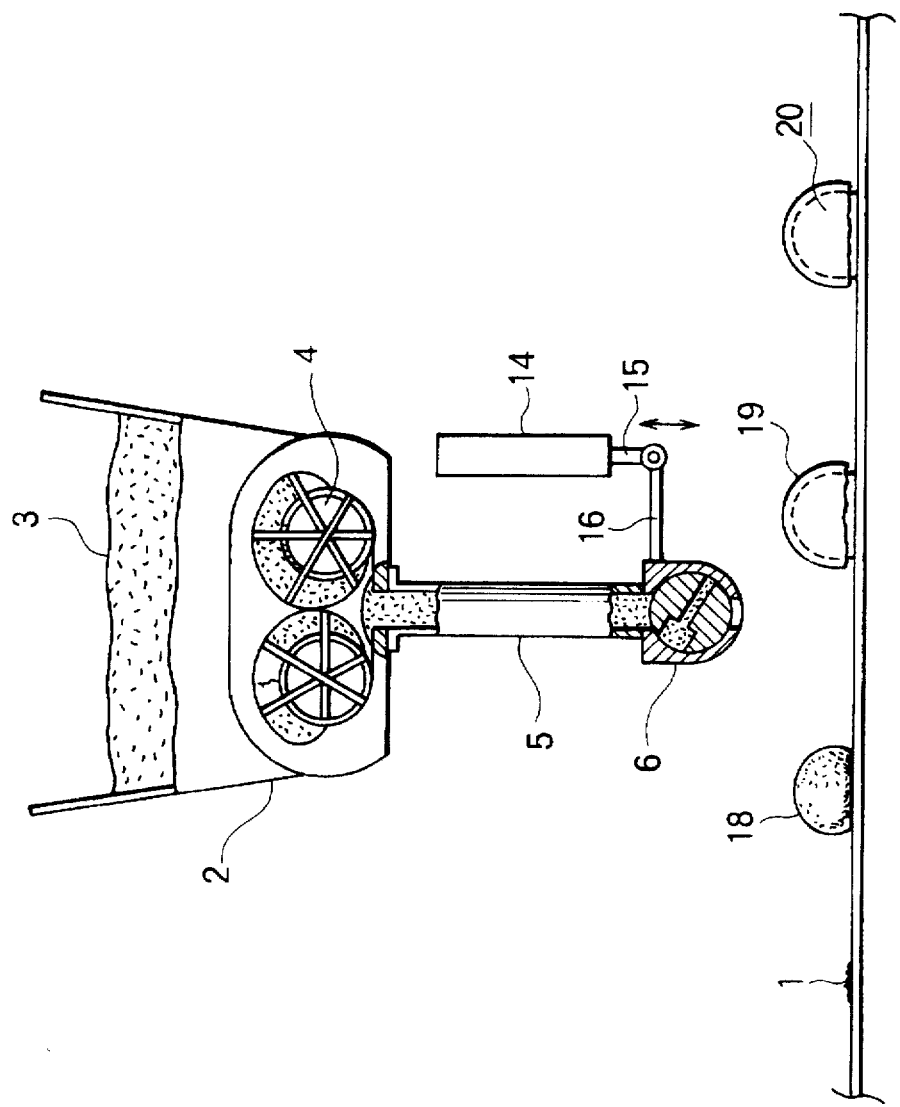
FIG. 1 is a partial cross section to show the effect and structure of a first embodiment of the present invention.

A first embodiment of the food-material discharging apparatus is now explained by reference to FIGS. 1 to 6. A conveying device 1 is provided. It is a conveyor that moves continuously at a fixed speed or intermittently. A hopper 2 has an extruding pump 4 that extrudes a dough topping 3 (hereinafter "dough") and a supply pipe 5 is connected at its upper end to the exit of the extruding pump 4. The extruding pump 4 can be, for example, a vane pump of a volumetric-type, but it is not limited to such a pump.

The dough 3 consists of biscuit dough or biscuit dough mixed with, for instance, chocolate chips or raisins, etc.

The lower end of the supply pipe 5 is formed with a discharge valve 6.

Figure 2:
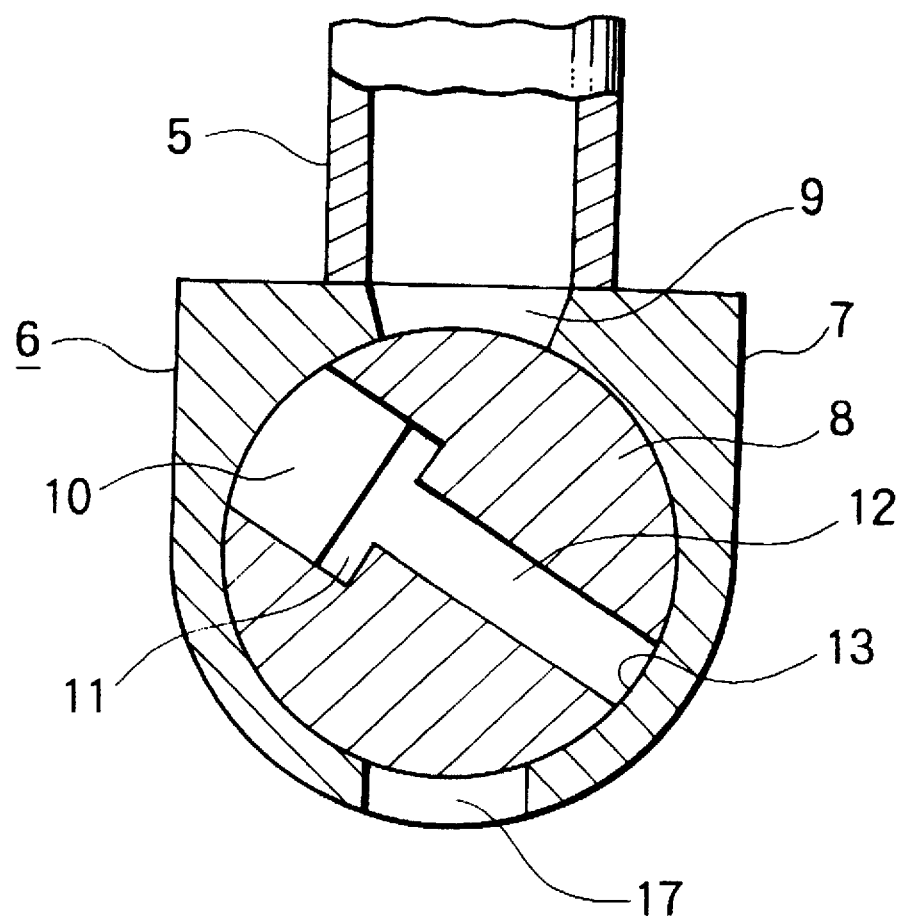
FIG. 2 is a front view in cross section to show the discharge valve of the first embodiment of the present invention.

As in FIG. 2, the discharge valve 6 consists of a housing 7 and a rotor 8.

The housing 7 has a material-feeding opening 9 for feeding the dough 3, and the upper end of the opening 9 is detachably connected to the supply pipe 5.

The rotor 8 is inserted in the housing 7 and is rotatably supported by it so that the rotor can reciprocate. As in FIG. 4, the rotor 8 has a space that is provided as a path that connects an inlet 10 for the dough 3, a guiding chamber 11, and a long aperture 12.

The inlet 10 has a cross section of a width W1 and a thickness of T1, and the upper end of it is aligned with the material-feeding opening 9 of the housing 7.

The guiding chamber 11 is a space having a width of W2 that is greater than the width of the inlet 10 (W2>W1), a thickness of T1, and a depth of D1.

The long aperture 12 extends from the lower surface of the guiding chamber 11 to the discharge opening 13 of the rotor 8. The aperture 12 has a width of W2, a thickness of T2 (<T1), and a depth of D2 to provide a long aperture.

Although the shape of the inlet 10 and the long aperture 12 differ, their cross sections are made to be the same, namely, W1×T1=W2×T2.

The rotor 8 is connected to a rod 15 of an air cylinder 14 via an arm 16 and the rotor 8 reciprocally rotates in the housing 7 as the rod 15 extends and retracts. The discharge outlet 17 of the housing 7 is also a long aperture, having a space larger than that of the discharge opening 13 of the rotor 8.

Figure 3:
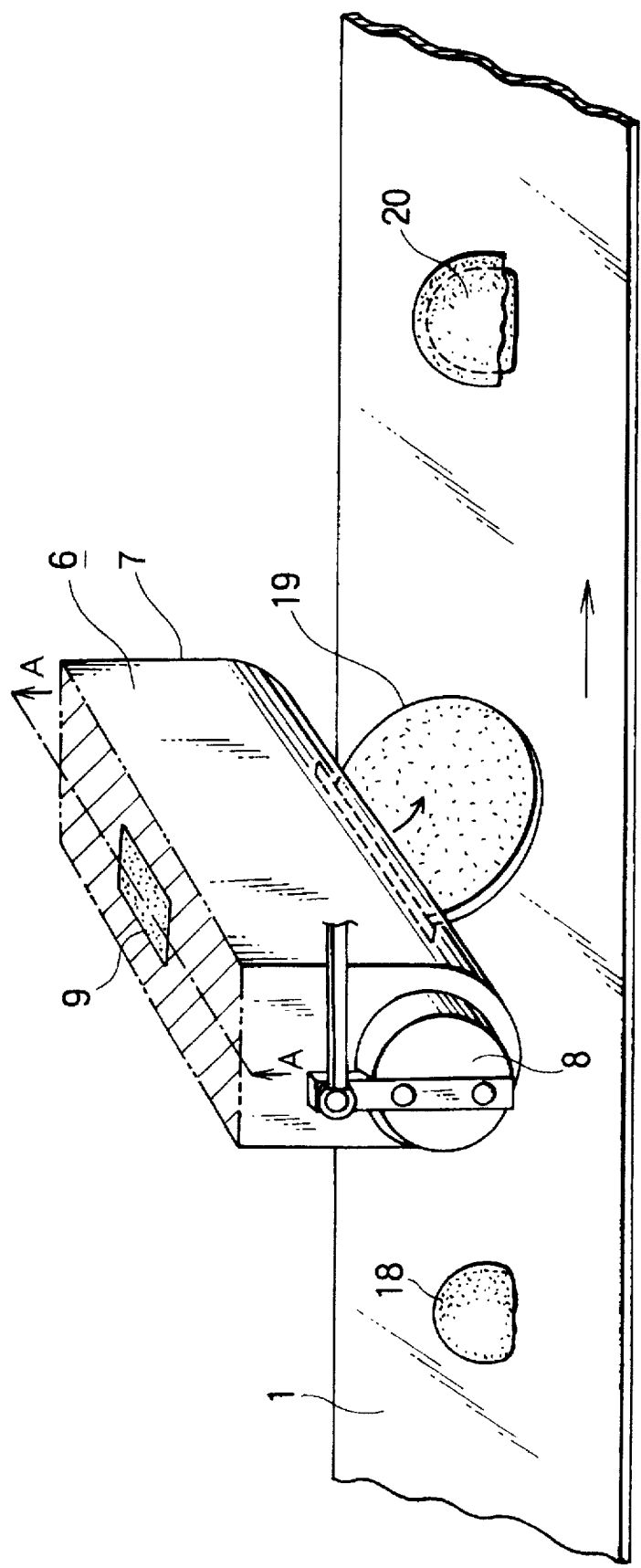
FIG. 3 is a perspective view to show the effect and the partial structure of the first embodiment.
Figure 4:
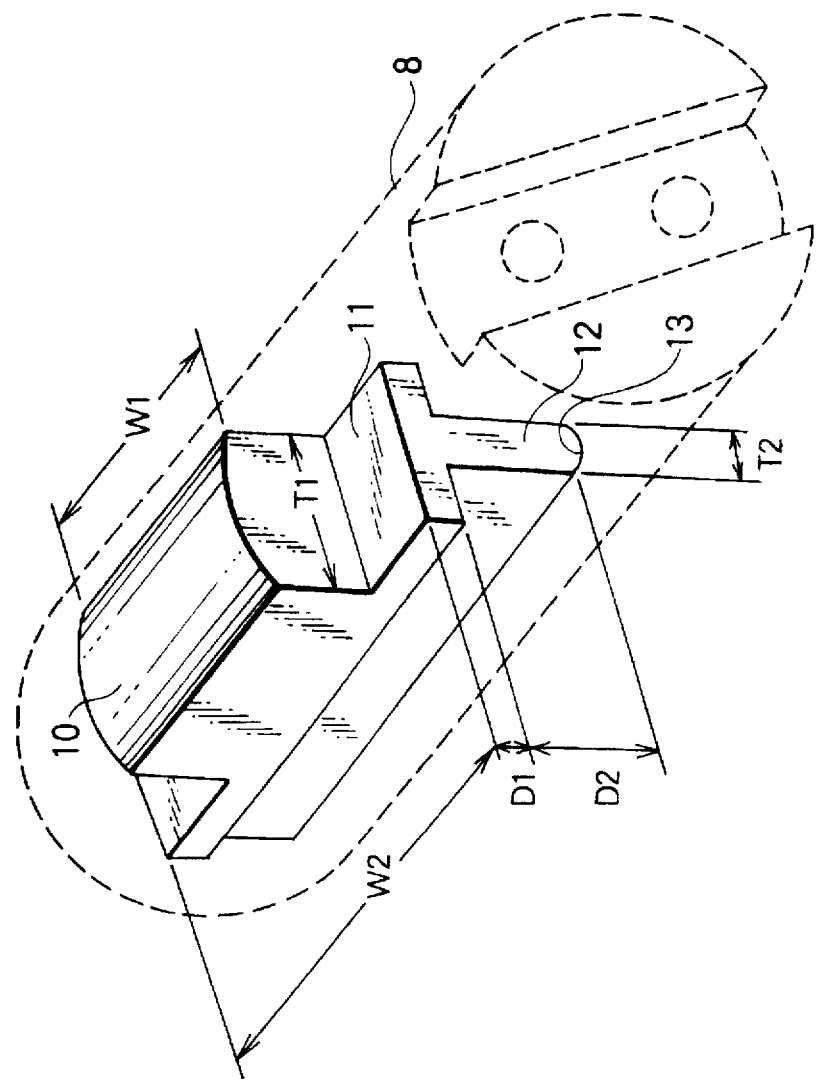
FIG. 4 is a perspective view that explains the inner structure of the rotor of the first embodiment.
Figure 5:
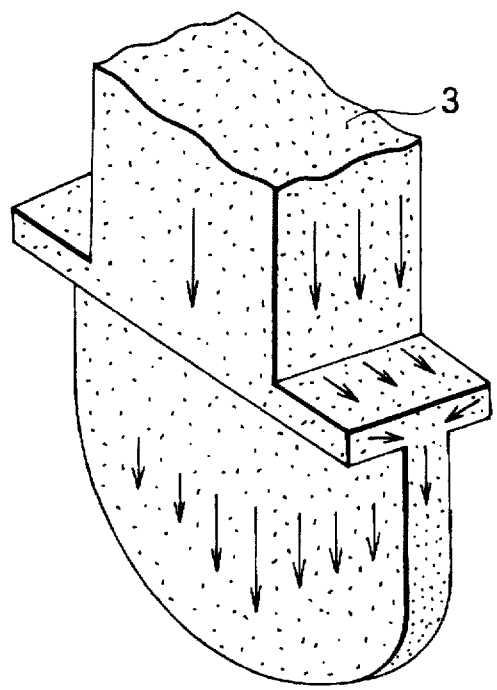
FIG. 5 is a perspective view to explain the flow and effect of the food dough of the first embodiment.
Figure 6:
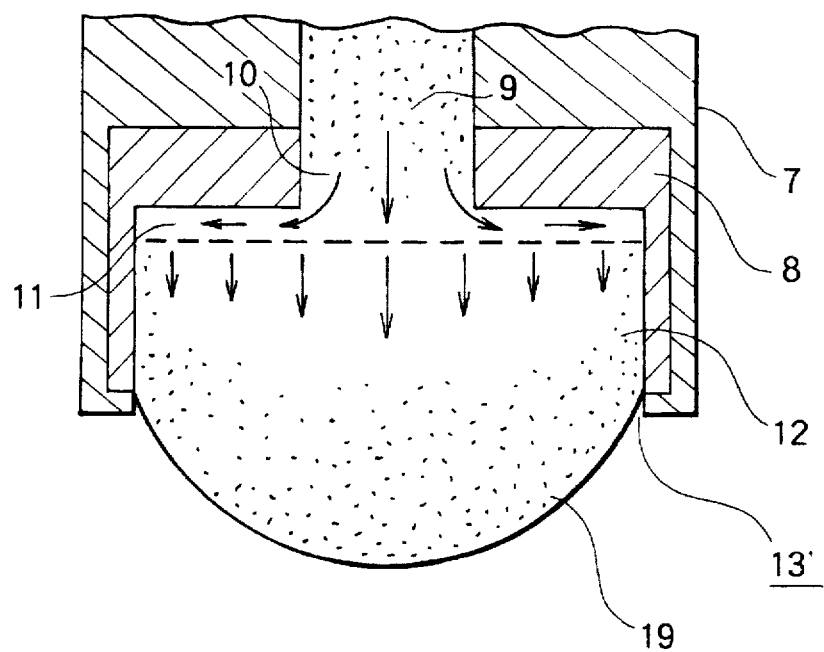
FIG. 6 is a cross section taken along the line A—A in FIG. 3.
Figure 7:
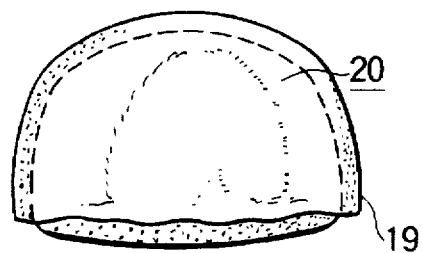
FIG. 7 is a front view of the melon dough before baking of the first embodiment.
Figure 8:
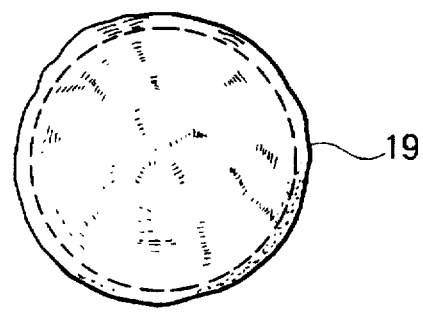
FIG. 8 is a plan view of the melon dough before baking of the first embodiment.
Figure 9:
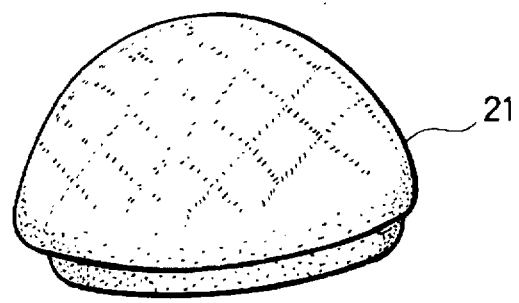
FIG. 9 is a front view of the melon dough after baking of the first embodiment.

In FIG. 3 the number 18 denotes molded bread dough that is being conveyed. A dough sleet 19 discharged from the discharge outlet 17 of the housing 7 is deposited on the bread dough 18 from above to form melon bread dough 20. The number 21 in FIG. 9 denotes baked melon bread.

Figure 10:
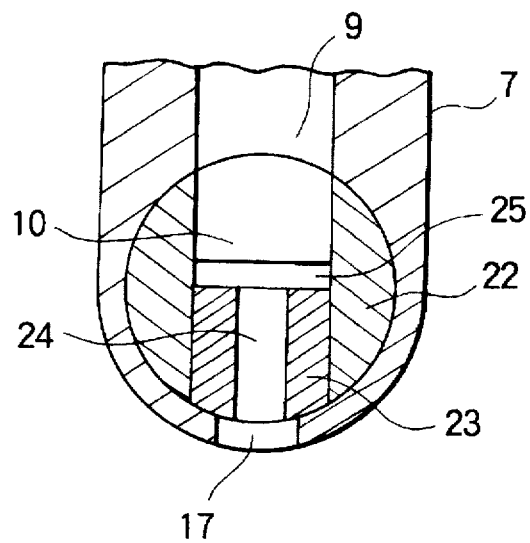
FIG. 10 is a partial cross section to show the inner structure of the discharge valve of a second embodiment of the present invention.
Figure 11:
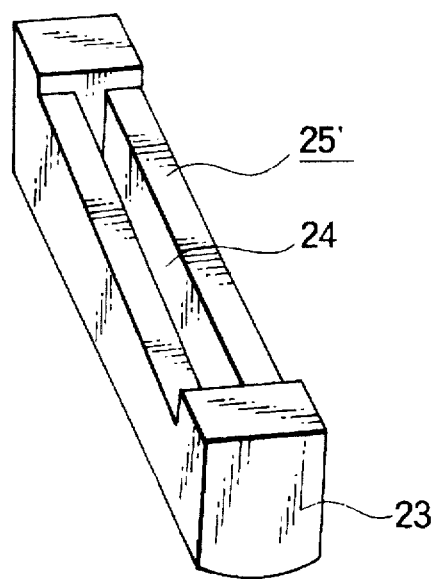
FIG. 11 is a perspective view of a nozzle member of the second embodiment.
Figure 12:
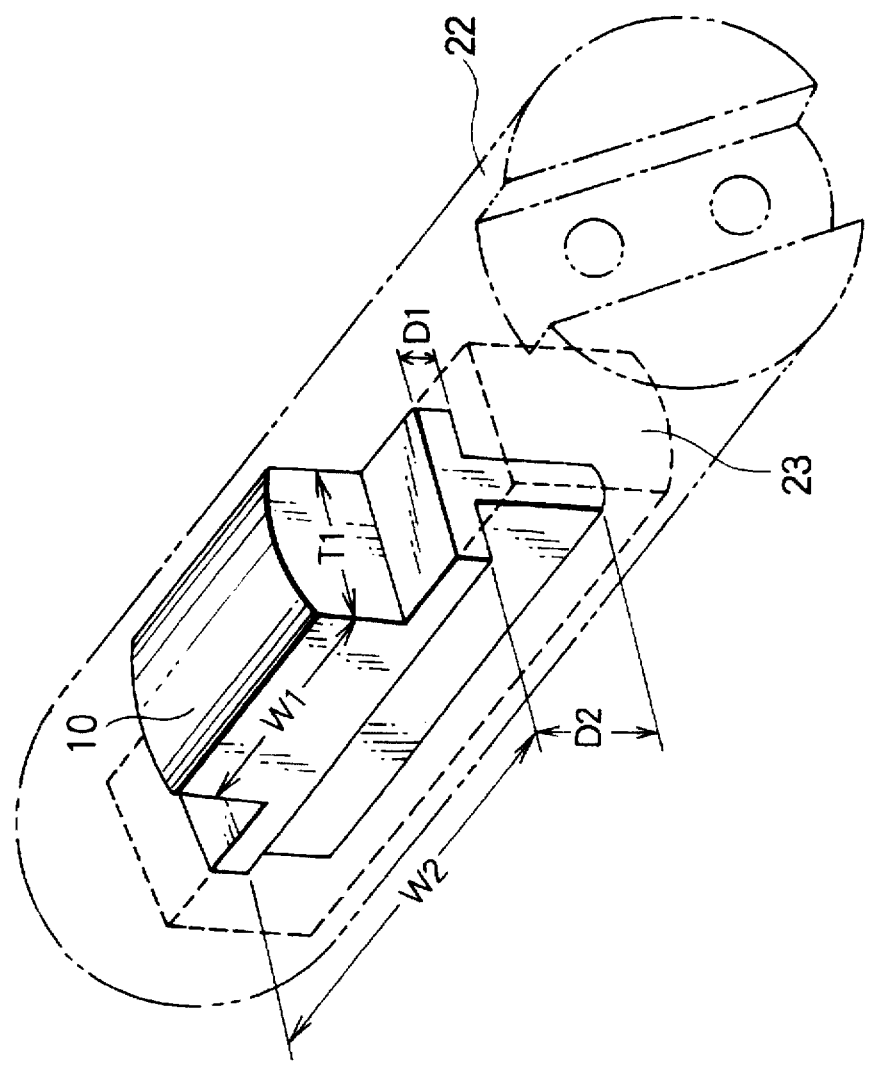
FIG. 12 is a perspective view to explain the inner structure of the rotor of the second embodiment.
Figure 13:
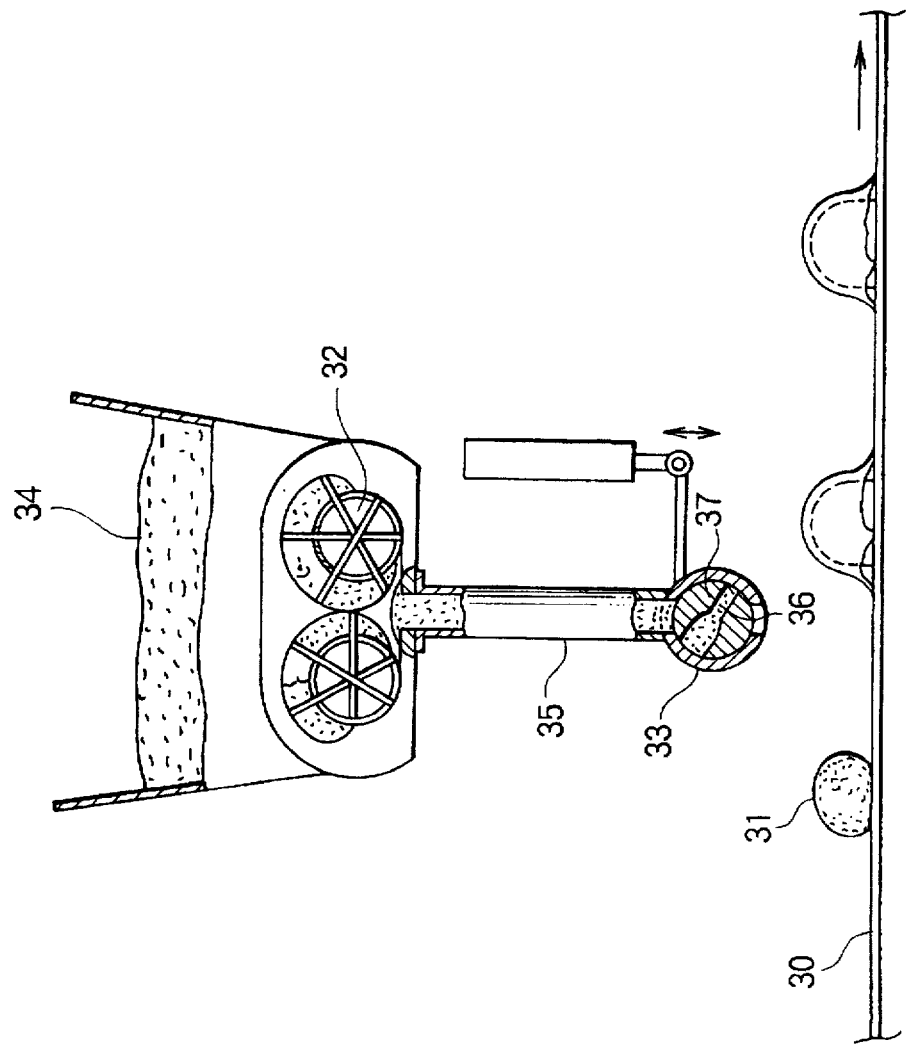
FIG. 13 is a partial cross sectional front view to show the effect and structure of a prior-art apparatus.
Figure 14:
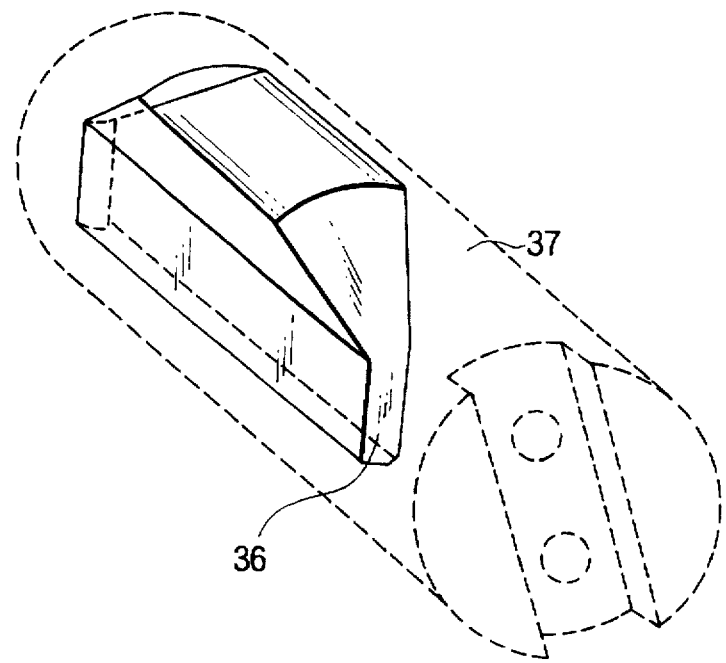
FIG. 14 is a perspective view to show the inner structure of a rotor of a prior-art apparatus.
Figure 15:
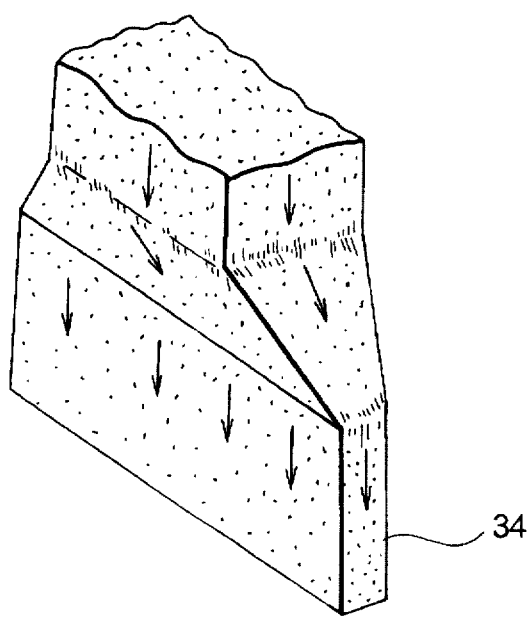
FIG. 15 is a perspective view to explain the flow and effect of the food dough in the prior-art apparatus.
Figure 16:
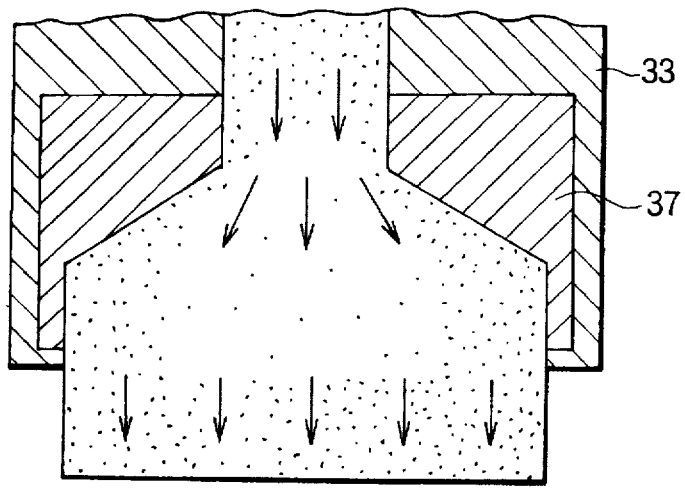
FIG. 16 is also a perspective view to explain the flow and effect of the food dough in the prior-art apparatus.
Figure 17:
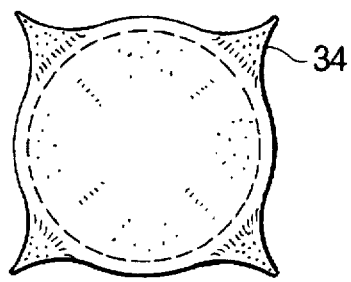
FIG. 17 is a plan view of the melon bread before baking by the prior-art apparatus.
Figure 18:
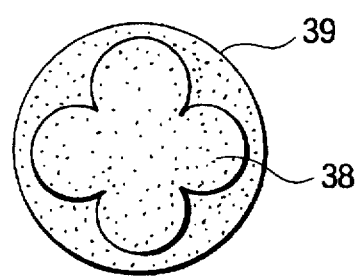
FIG. 18 is a bottom view of the melon bread after baking by the prior-art apparatus.

A second embodiment of the present invention will now be explained by reference to FIGS. 10 to 12. The apparatus of this embodiment is the same as that of the first embodiment except for the rotor 8 of the first embodiment. Thus in the second embodiment the same numbers are used for the same elements as in the first embodiment, but the associated explanation is omitted. A rotor 22 is rotatably mounted in the housing 7 and a nozzle member 23 is detachably mounted on the rotor 22. The nozzle member 23 is formed with a long aperture 24 and has a recessed portion 25' that forms a guiding chamber 25.

By providing the separable nozzle member 23 as above and by constructing the rotor 22 by a plurality of members, the nozzle member 23 can be replaced by other types of nozzle members 23 having a long aperture 24 and a guiding chamber 25 of an appropriate size. By so doing, the shape of the dough 19 to be discharged can easily be changed.

The effect and function will now be explained. The bread dough 18 is continuously or intermittently conveyed and in synchronism with its movement the extruding pump 4 for extruding the dough 3 stops rotating, and an air cylinder 14 is activated intermittently, so that the discharged dough 19 is deposited on the bread dough 18.

Due to the activation of the air cylinder 14, the rotor 8 in the housing 7 rotates to form a passage for the dough 3 from the material-feeding opening 9 to the discharge outlet 17.

In this condition the dough 3 in the hopper 2 passes through a supply pipe 5, the material-feeding opening 9, the inlet 10, the guiding chamber 11, and the long aperture 12, and the discharge dough 19 is extruded from the discharge mouth 13.

Since the discharge dough 19 expands in the fermenting process, its height becomes high, and thus the dough topping can fully cover the bread dough 18.

Thereafter the extruding pump 4 is rotated and stopped, and the air cylinder 14 rotatively retracts, so that the flow of the discharged dough 19 is cut so as to form the melon bread dough 20.

Since the width W of the guiding chamber 11 is larger than that of the inlet 10, the dough 3 receives high pressure at the central part, and the pressure decreases toward either end of the dough 3. Also, the flow of the dough 3 towards the ends of the guiding chamber takes time.

Due to the provision of the long aperture 12 of a desired size at the bottom of the guiding chamber 11, the dough 3 flows in the guiding chamber 11, receiving the pressure mentioned above, and the flow of the dough 3 towards both ends of the guiding chamber 11 takes time. The dough 3 enters the long aperture 12 to be discharged therefrom. Eventually the discharge dough 19 begins to be discharged from the central portion of the discharge opening 13 and is gradually discharged toward both ends of the guiding chamber 11 due to the time lag of the dough's flow mentioned above. By this structure the discharge dough 19 is initially extruded from the central part of it followed by the extrusion toward both its ends, giving it a smoothly curved line. This eventually provides a dough sheet having a circular periphery. Thus it has become possible to discharge a discharge dough 19 in a circular shape.

Since the bread dough 18 for forming the melon bread dough 20 is round, and the discharge dough 19 is circular, the discharge dough 19 deposited on the bread dough 18 well fits the round surface of the bread dough, as opposed to the prior art wherein four extra corner portions appear around the periphery of the discharge dough. Also, since the boundary between the discharge dough and the bread dough after baking is round at the bottom surface and the side surface, it provides melon bread having a good appearance. The curvature of the leading edge and the trailing edge of the discharge dough 19 depends on the elasticity of the dough 3, the cross-sectional ratio of the inlet 10 and the guiding chamber 11, and the depth D1 of the guiding chamber 11. If, for instance, the depth D1 is large, the curvature becomes small, and if the depth D1 is small the curvature becomes large.

In this embodiment the cross sections of the inlet 10 and the long aperture 12 are made to be the same. But they are not so limited. The cross section can be determined as desired, depending on the kind of the product to be produced or the elasticity of the dough 3, etc. Also, when the depth D2 of the long aperture, namely, the distance from the guiding chamber 11 to the discharge opening 13, is small, the pressure difference in the dough 3 to be supplied to the long aperture 12 directly affects the discharge dough 19. Thus the discharge dough 19 becomes a spindle-like sheet dough whose thickness bulges at its central portion in the longitudinal direction. Conversely, if the depth D2 of the long aperture is large, the pressure in the long aperture 12 is equalized, thereby producing a dough sheet of a predetermined thickness.

Although the present invention was explained by showing embodiments to produce melon bread, the present invention should not be limited to only it. The present invention enables elastic food dough to be formed into sheet-like foodstuffs having a circular or an oval shape, or enables such a sheet of such a shape to be applied to foodstuffs. Although it was explained that in the embodiments the extruding pump intermittently rotates, the pump may also continuously rotate.

EFFECT OF THE INVENTION

As explained above, since the present invention provides an apparatus for intermittently discharging sheet-like foodstuffs, the apparatus comprises a housing in which a cylindrical rotor is rotatably mounted, the rotor being provided therein with an inlet to communicate with a material-feeding opening of the housing, a guiding chamber, the cross section of which is larger than that of the inlet, and a long aperture formed in the rotor, the aperture communicating with the guiding chamber and the cross section of the aperture being smaller than that of the guiding chamber, whereby when the foodstuffs are supplied into the rotor through the material-feeding opening, they pass through the rotor, so that foodstuffs of a circular or oval sheet form are discharged from the discharge outlet of the housing, so that melon bread, etc. can be easily produced.

Also, by constructing the rotor using a plurality of elements, the size of the guiding chamber can be freely changed, making it possible to discharge sheet-like dough of a desired length and thickness.

Further, the shape of the circular or oval sheet can easily be adjusted.

We claim:

1. An apparatus for intermittently discharging a circular or oval dough sheet from a mass of dough retained in a hopper comprising:

an extruding pump provided at the bottom of the hopper;

a discharge valve having a housing, a rotor, and an air cylinder, for intermittently discharging a dough sheet of a predetermined shape;

a supply pipe connecting the extruding pump to the discharge valve for feeding extruded dough into the rotor; and a path space provided in the rotor comprising an inlet, a guide chamber, and an aperture for forming a circular or oval dough sheet by passing fed dough therethrough, the path space being formed such that when the path space is aligned with the supply pipe the horizontal cross section of the guide chamber is larger than that of the inlet and the aperture, whereby a circular or oval dough sheet is discharged through the aperture.

2. An apparatus of claim 1, wherein the guide chamber and the aperture are adjustably formed by a plurality of replaceable nozzle members to provide a dough sheet of desired shape.

3. A discharge valve in an apparatus for discharging a circular or oval shaped dough sheet comprising:

a) a housing including an opening for receiving dough; and b) a rotor for intermittently discharging a dough sheet of predetermined shape including an inlet, a guide chamber, and an aperture, each having a horizontal cross section, wherein the horizontal cross section of the guide chamber is larger than that of the inlet and the aperture, such that when the inlet is aligned with the opening, dough is fed through the opening, the inlet and the guide chamber and is discharged through the aperture as a circular or oval shaped dough sheet.

4. In an apparatus for intermittently discharging a dough sheet including a hopper, an extruding pump, and a discharge valve, the improvement comprising:

the discharge valve comprising a housing including an opening for receiving dough, and a rotor for intermittently discharging a dough sheet of predetermined shape including an inlet, a guide chamber, and an aperture, each having a horizontal cross section, wherein the horizontal cross section of the guide chamber is larger than that of the inlet and the aperture, such that when the inlet is aligned with the opening, dough is fed through the opening, the inlet and the guide chamber and is discharged through the aperture as a circular or oval shaped dough sheet.

* * * * *